Feb. 28, 1950    G. K. LEWIS    2,498,738
PICTURE SLIDE MOUNT
Filed Nov. 19, 1945    2 Sheets-Sheet 1
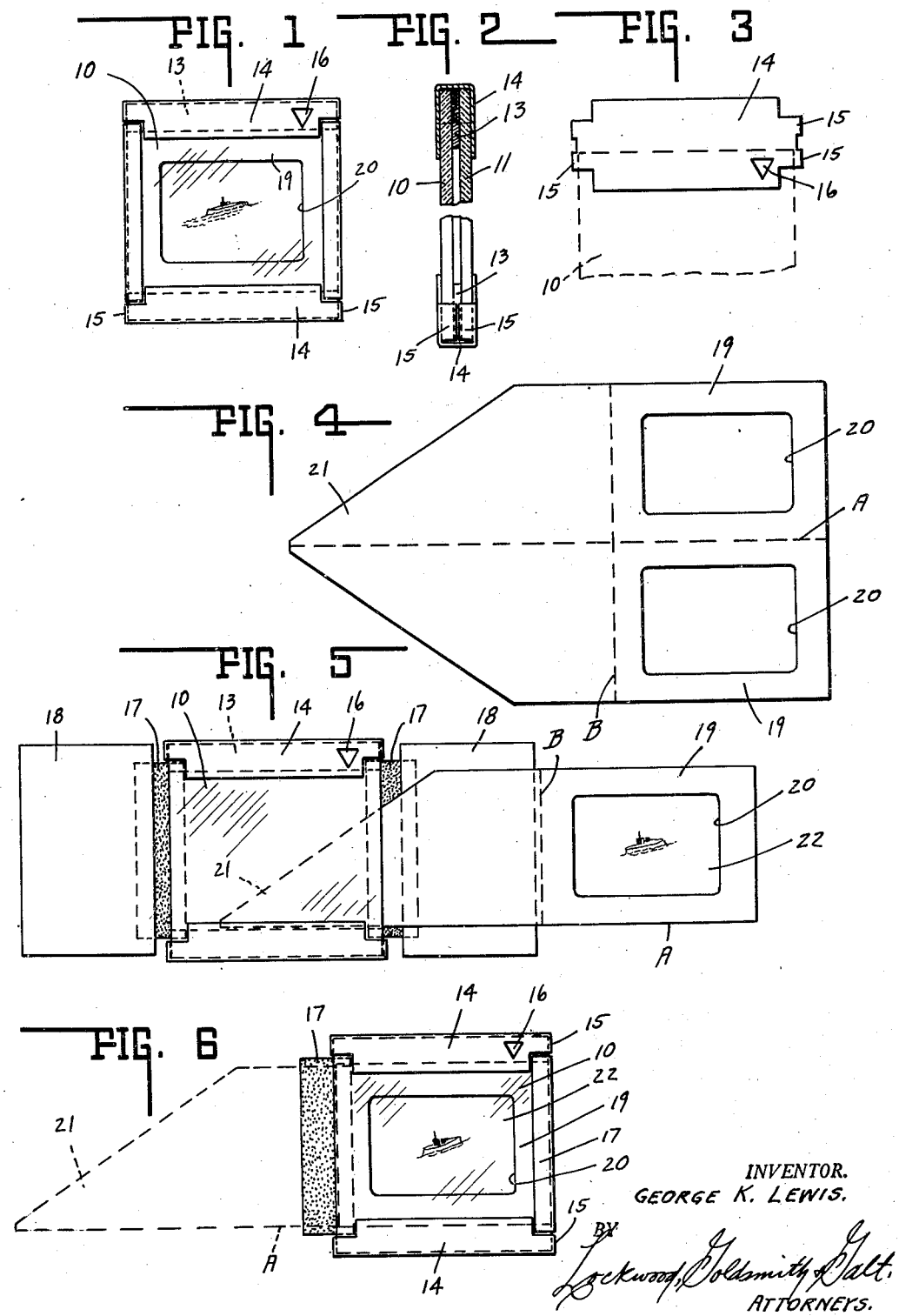
INVENTOR.
GEORGE K. LEWIS.
BY
Lockwood, Goldsmith & Galt.
ATTORNEYS.

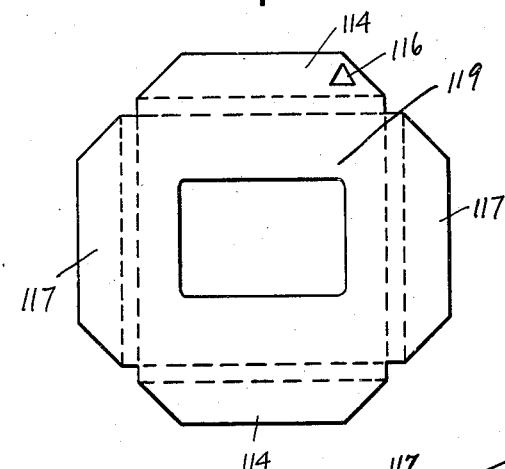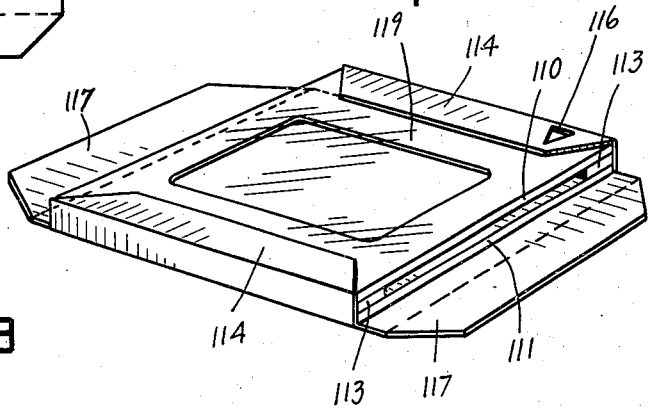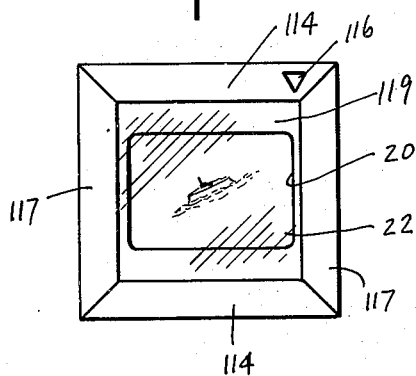

Patented Feb. 28, 1950

2,498,738

UNITED STATES PATENT OFFICE 2,498,738

PICTURE SLIDE MOUNT

George K. Lewis, Chicago, Ill., assignor to Three Dimension Company, Chicago, Ill., a copartnership Application November 19, 1945, Serial No. 629,572

6 Claims. (Cl. 40—158)

This invention relates to a picture slide mount for transparencies, and particularly those of the type used in projecting machines, and known as "lantern slides." It is the object of the invention to provide a convenient and rapid method of making up photographic films into slides comprising glass sandwich plates sealed about their periphery to prevent entry of moisture and foreign matter therein, and wherein the arrangement and method of assembly avoids finger prints, dust and the like from disfiguring the inner surface of the plates.

It is the purpose of this invention to facilitate mounting of the film in the slide and between the plates. To that end the slide is provided for use as a unit preassembled and protected to conveniently receive the film, and the masking mat for the film carries a leader strip to permit convenient insertion of the mat, with the film placed therein, into position between the plates.

The full nature of the invention will be understood from the accompanying drawings and the following description and claims.

Fig. 1 is a front elevation of the finished slide with a transparency or film mounted therein.

Fig. 2 is illustrative of the preformed slide comprising the spaced glass plates, the upper portion thereof being shown in central vertical section and the lower portion thereof being in end elevation.

Fig. 3 is a layout of one of the clamping and retaining molding strips.

Fig. 4 is a layout of the mat with leader strip.

Fig. 5 is a plan view of the preformed slide showing the mat containing the transparency being introduced between the glass plates.

Fig. 6 is a plan view of the slide with a transparency and mat inserted therein preparatory for final operation.

Fig. 7 is a layout of a modified form of the clamping and retaining molding strips formed integral with the binding strips.

Fig. 8 is a perspective view of the modified form of Fig. 7 showing a preformed slide unit.

Fig. 9 is a plan view of the modified form of slide after the transparency and mat have been inserted therein.

In the drawings, as best shown in Figs. 2 and 5, there is shown a preformed slide comprising a pair of spaced glass plates 10, 11, said plates being held in spaced relation by the spacer strips 13 extending between the plates. Along the upper and lower edges of the plates for rigidly clamping and holding them together, there is provided a clamping strip in the form of a molding 14. Said molding is of thin pliable material blanked out, as illustrated in Fig. 3, with formed end projections 15 so arranged as to be folded over the edges of the plates as best indicated in the lower portion of Fig. 2. One of said moldings may be provided with a device, such as shown at 16, for conveniently indicating the top side of the slide.

The spacer strip 13 and the molding are provided with suitable adhesive to permanently affix the plates in their spaced relation to provide a unitary prefabricated structure. This is accomplished by suitable jigs and apparatus for producing the complete slides rapidly and accurately, and wherein the plates are cleansed and polished before assembly and assembled without fingering so that the inner surfaces of the plates will be preserved from surface markings.

In production, and as a part of the unit, adhesive binder strips 17 are secured along the open edges of the slide, as shown in Fig. 5. Lightly attached along the free edges of the binder strips there are secured paper envelope sheets 18. The envelope sheets 18 are adapted to be folded over one face of the slide so that the binder strips enclose the open edges of the slide and thereby prevent dirt and moisture from entering between the plates.

The unit slides thus formed with the edges of the glass plates completely enclosed and protected are then sold to the users for insertion of individual transparencies or films, together with a mat 19, as shown in Fig. 4. The mat 19 is formed to fold over the edges along the dotted line A, and is provided with opposed registering apertures 20 of the proper size and shape to frame the picture. When folded over the dotted line A, the mat is in the form shown in Fig. 5, with a tapered leader strip 21. Said leader strip is connected to the mat by a perforated line indicated by the dotted line B. The mat is adapted to receive and frame the film indicated at 22.

The method employed in mounting the film in the slide comprises the following steps: The user is provided with a supply of slide units prefabricated, as above described, each slide unit comprising the plates with attached envelope sheets folded over each other. The user is further supplied with individual mats, as above described, and as illustrated in Fig. 4. To mount the film, he first folds the mat along the dotted line A and then mounts the film within the folded mat to register with the framed aperture 20. The envelope sheets 18 are then folded back to the position shown in Fig. 5, together with the binder strips 17, such as to free the spaced edges of the glass plates. The tapered leader strip 21, which terminates in a pointed end, is threaded between the glass plates in the manner shown by dotted lines in Fig. 5. The mat is thus introduced into the slide until the leader strip protrudes beyond the opposite edge, whereby the mat may be drawn into position to register with the slide, as shown in Fig. 6. Thereupon the leader strip is torn off along the dotted line B, leaving the mat with the film contained therein in properly framed position. The envelope sheets 18 are gently removed from the binder strips which are then folded over the open edges of the glass plates, to seal and bind them intermediate the metal moldings extending along the top and bottom. The leader strip 21 and envelope sheets 18 are then discarded and the slide is properly loaded.

From the foregoing it will be observed that in framing the picture in the slide, the operation is rapid and simple, avoiding any touching or mutilation, such as to mar the inner surface of the glass plates, as well as avoiding improper handling of the film itself, and wherein the completed picture slide is strong and rugged, precision built and protected against dirt and moisture.

While one embodiment of the invention has been shown, it is understood that the inventive concept may be carried out in a number of ways. This application is, therefore, not to be limited to the precise details disclosed, but is intended to cover all variations and modifications thereof falling within the spirit of the invention and appended claims.

In the modified form of the invention, the opposed clamping strips 114, in the form of a molding, are formed integral with the opposed binder strips 117, their unitary formation being such as to envelop the plates 110, 111 with an intermediate mat-like portion 119 coextensive with the mat 19 to be inserted between the plates. The indicating device 116 is provided upon the clamping strip which will be uppermost when the aperture is inserted.

In this form, the clamping strips and the binder strips may be stamped out of one piece of material whereupon the plates 110 and 111 with their spacing strips 113 may be positioned centrally of the structure, the contacting face of which is provided with a film of suitable bonding material. The glass plates are then clamped with their opposed edges enveloped by the clamping strip 114 forming the molding to which heat is applied for rendering the bonding film effective to permanently secure the strips 114 about the sandwiched glass plates. However, the strips 117 which are thus secured along the side edges of one of the glass plates 111 are not folded over and bonded until after the leader strip 21 of the mat 19 is inserted and pulled between the glass plates in the manner illustrated in Figs. 5 and 6. Upon the mat 19 being centered between the plates, the leader strip 21 is removed and the binding strips 117 are then folded over the exposed end edges of the plates and bonded thereabout in the manner illustrated in Fig. 9.

The invention claimed is:

1. A picture slide for projectors comprising a pair of spaced glass plates, clamping and retaining molding strips embracing said plates along their upper and lower edges and adhesively secured thereto, means associated with said strips and placed for retaining said plates in spaced relation to receive a picture film therebetween, flexible binder strips adhesively secured along opposite end edges of one of said plates, and protective envelope sheets removably secured to said binder strips respectively adapted to fold over said plates for protection before loading and be separated therefrom upon loading said slide to permit sealing by said strips of the end edges thereof intermediate said moldings.

2. A picture slide for projectors comprising a pair of spaced glass plates, a spacing strip adhesively secured between said plates along their upper and lower edges, clamping and retaining molding strips embracing said plates along their upper and lower edges and permanently secured thereto, the ends of said molding strips being inwardly bent to overlap the end edges of said plates, flexible binder strips adhesively secured along the other opposed end edges of one of said plates, protective envelope sheets removably secured to said strips respectively adapted to fold over said plates before loading said slide and separable therefrom after said slide is loaded to permit sealing of the edges by said strips, and a framing mat folded over itself and apertured to receive a picture film therein, said mat being provided with a tapered leader strip insertable between said plates for drawing said mat into position therein, said leader strip being separable from said mat to permit the end edges of said plates to be sealed by said binder strips.

3. In a picture slide for projectors, a framing mat for receiving a picture film, said mat being folded upon itself to embrace and support the film and having opposed registering apertures through which the picture may be viewed, and a leader strip extending from one end of said mat for threading into the slide to facilitate positioning of the mat therein, said leader strip being separable from said mat after positioning thereof.

4. In a picture slide for projectors, a framing mat for receiving a picture film, said mat comprising two apertured sheets for enveloping the film therein while permitting viewing of the picture therethrough, and a leader strip extending from one end of said mat for threading into the picture slide to facilitate drawing and positioning the mat therein, said leader strip being separable from said mat after positioning.

5. In a picture slide for projectors having a pair of spaced glass plates, a framing mat for receiving a picture film, said mat being folded upon itself to embrace and support the film therein and having opposed registering apertures through which the picture may be viewed, and a leader strip formed as a continuation of said mat extending outwardly from one end thereof and tapered to a point adapted to be threaded between said plates to facilitate drawing and positioning the mat therein, said leader strip being separable from said mat after positioning thereof.

6. In a picture slide for projectors comprising spaced plates permanently secured along their upper and lower edges and having their end edges open and protected by adhesively coated binding strips with separable flaps, the method of mounting therein a framing mat carrying a picture film consisting in folding said flaps and binding strips outwardly away from said plates to expose the open end edges thereof, threading a leader strip secured to said mat between the spaced plates to draw and position the mat therein, separating said leader strip from the mat, separating said flaps from their respective strips, and securing said freed strips over and about the edges of said plates to seal the mat and film within the slide.

GEORGE K. LEWIS.

REFERENCES CITED

The following references are of record in the file of this patent:

UNITED STATES PATENTS

| Number | Name | Date |
|---|---|---|
| 471,586 | Whitney | Mar. 29, 1892 |
| 855,121 | McCormick | May 28, 1907 |
| 1,376,677 | Coufal | May 3, 1921 |
| 1,568,674 | Knowles | Jan. 5, 1926 |
| 1,679,928 | Birdsall | Aug. 7, 1928 |
| 1,823,295 | Sauer | Sept. 15, 1931 |
| 2,155,078 | Brown | Apr. 18, 1939 |
| 2,164,655 | Kleerup | July 4, 1939 |
| 2,165,790 | Engel | July 11, 1939 |
| 2,184,007 | Staehle | Dec. 19, 1939 |
| 2,210,411 | Johnson et al. | Aug. 6, 1940 |
| 2,292,272 | Hirshfield | Aug. 4, 1942 |
| 2,330,292 | Knight et al. | Sept. 28, 1943 |

FOREIGN PATENTS

| Number | Country | Date |
|---|---|---|
| 192,144 | Great Britain | Jan. 25, 1923 |